April 17, 1951 W. A. DEPP 2,549,064

MULTISWITCHING GASEOUS DISCHARGE DEVICE

Filed March 5, 1948 2 Sheets-Sheet 1

INVENTOR
W. A. DEPP
BY [signature]
ATTORNEY

April 17, 1951 W. A. DEPP 2,549,064

MULTISWITCHING GASEOUS DISCHARGE DEVICE

Filed March 5, 1948 2 Sheets-Sheet 2

INVENTOR
W. A. DEPP
BY [signature]
ATTORNEY

Patented Apr. 17, 1951 2,549,064

UNITED STATES PATENT OFFICE 2,549,064

MULTISWITCHING GASEOUS DISCHARGE DEVICE

Wallace A. Depp, Elmhurst, N. Y., assignor to Bell Telephone Laboratories, Incorporated, New York, N. Y., a corporation of New York Application March 5, 1948, Serial No. 13,283

18 Claims. (Cl. 250—27.5)

This invention relates to gaseous glow discharge devices and more particularly to multiswitching devices for controlling the transfer of current in a predetermined manner.

In certain central office automatic telephone systems, numerous switching operations must be performed before an incoming call is connected to an idle line of a called subscriber to complete the connection between the parties. These switching operations are usually performed by relays or other mechanical switching devices which require substantial supervision and maintenance. Furthermore, such mechanical devices have a relatively short life due to mechanical failure of the parts entering into their construction. They also deteriorate rapidly due to high current drain and are relatively slow in operation.

An object of this invention is to overcome these defects by providing glow discharge devices operating on a voltage basis and capable of performing the multifarious switching operations.

A further object of the invention is to increase the life of the switching components of the system by the use of multi-element glow devices which are only operative for short intervals and draw no current during long standby periods.

Another object of the invention is to render unnecessary continual supervision and maintenance in the operation of automatic central office switching systems, by reason of the use of inertialess multiswitching devices to perform the control operations of the system.

A further object of the invention is to increase the sensitivity of control in multiswitching devices so that signal storing may be maintained indefinitely until the proper combination of voltages on the electrodes permits the completion of the circuits between the calling and called lines of the system.

Another object of the invention is to coordinate the relationship of multiple electrodes operating in a self-contained group to effect the train of switching operations for completing the active circuits in the system.

A further object of the invention is to expedite the train of switching operations in a predetermined manner in a controlled gaseous environment to attain stabilized functional operation.

A still further object of the invention is to secure lock-out operation between a group of cooperating electrodes in a glow discharge switching device by electronic discharge breakdown and transfer processes to select a particular control device among a group of similar devices.

A further object of the invention is to provide a discharge device having a main discharge gap and a plurality of control discharge gaps which are energized in sequence to control a network of switches and circuits.

These objects are attained in accordance with the broad aspects of this invention by the grouping of multiple cooperating electrodes in gaseous discharge devices to perform a series of transfer operations in sequence under predetermined conditions to effect the coupling of the calling and called subscribers' lines over the network of switching frames in a central automatic exchange.

In a specific embodiment of the invention, a glow discharge device comprises a symmetrical arrangement of multiple groups of cooperating electrodes or elements to sequentially control the transfer of discharge current in the device during the set-up time for establishing a connection between the calling and called subscriber lines in the system. This arrangement includes a main cathode surface mounted in transverse position so that it is exposed to all the discharge paths in the device, separate pairs of auxiliary gap electrodes uniformly spaced with respect to the cathode surface, associate anodes for the respective pairs of gap electrodes mounted in linear relation thereto and a main anode intermediate the associate anodes, the latter forming one of the supports of the main cathode assembly. The symmetrical grouping of the elements provides increased breakdown voltages between the respective electrodes and prevents high voltage surge breakdown from the main gap electrodes which might impair the control characteristics of the auxiliary gap element groups.

In another specific embodiment of the invention, the glow discharge device includes spaced initiating and terminating groups of electrode elements and intermediate therebetween a main cathode element and a plurality of auxiliary and main anode elements disposed in cooperating relation to effect the train of switching controls in a definite sequence originating in the initiating group elements and being completed in the terminating group elements. In this arrangement, the sequence of operations is determined by the respective potential applied to the electrodes in their assigned order to complete the train of switching controls for a given assignment prescribed by the calling subscriber in the operation of a network of switching equipment in the exchange for completing the call to the designated subscriber.

A feature of this assembly relates to the mounting of the initiating and terminating group elements in separate isolated relation to insure constant spacial relation between the control anode with respect to the control cathode surface in each group. This is accomplished by attaching the cathode surface to an angular support mounted on a conductor and spacing the anode wire close to the cathode surface by an insulating spacer block.

Another feature relates to the assembly of the main cathode element in the device to provide a large conducting surface while providing segregation from the other electrode groups in the device. This construction provides a cathode surface of three sections in superimposed relation on a pair of parallel supports with the edges of the sections in staggered relation to clear the smaller group elements adjacent thereto.

Another feature of the invention relates to the coupling of the control anode of the initiating group elements to a terminal conductor of the device included in the main cathode mounting assembly to reduce the number of terminal pins required on the base of the device. This assembly involves disrupting one of the main cathode supports adjacent the base and fitting an insulator spacer between the two sections of the support and utilizing the split support as a terminal for the control anode connection.

A further feature of the invention relates to the mounting of multiple anode elements in opposite relation to the main cathode surface and selectively controlling the discharges to these elements in a predetermined manner. This is accomplished by mounting a plurality of wire anodes in spaced relation at various distances from the cathode surface and masking a portion of a pair of anodes so that different lengths of the respective anode components are exposed to the discharge path so that the discharge is controlled in a definite sequences depending on the potential applied between the cathode and the respective auxiliary and main anodes in the device.

Another feature of the invention relates to the location of the initiating and terminating group elements with respect to the main cathode surface in the device to prevent interference between the incoming and outgoing control elements in the device. This is accomplished by displacing one group with respect to the other at different elevations but in equal spaced relation to the sections of the main cathode surface so that uniform control characteristics may be attained in the operation of the device.

These and other features and advantages of the invention will be more clearly set forth in the following detailed description which is to be considered in connection with the accompanying drawings in which.

Figure 1:
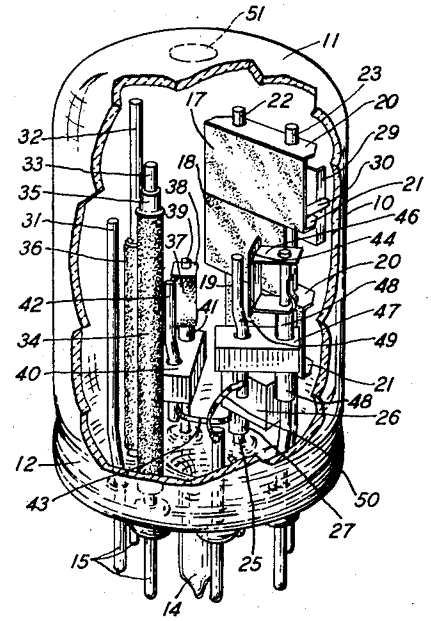
Fig. 1 is a perspective view of one embodiment of this invention with a portion of the vessel broken away to show the internal assembly and the correlation of the multiple groups of elements contained within the device.
Figure 2:
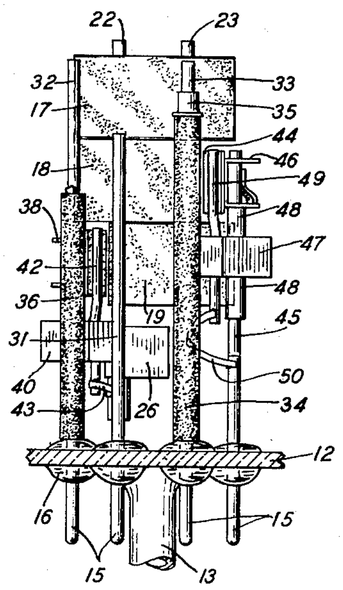
Fig. 2 shows a front view in elevation of the electrode elements as mounted on the stem of the device of Fig. 1.

In accordance with this invention, various forms of multi-element glow discharge devices are provided for controlling multifarious switching assignments to complete a sequence or train of operations and effect a through connection between remote points in a switching system and more specifically between calling and called subscriber lines in an automatic regional telephone exchange system. In a typical crossbar switching system, an originating call is routed through primary and secondary switches in the originating exchange and proceeds to the junctor switching frame and a register frame. After the called number is registered the call is completed to the called line under control of the register by way of a number group circuit and the junctor, tertiary switches and the primary and secondary switches.

By suitable connections to one or more of the electrodes exemplary devices embodying this invention may be employed to indicate or control the "class of service" to which a subscriber is entitled, such as party line, limited or extended service and other types of special services. If the call is within the scope of the class of service to which the subscriber is entitled, the circuits are completed to the called line or indication given by positive tests if busy or vacant. Such multiswitching operations require considerable time and present considerable difficulty in supervision and maintenance at the exchange points to keep the system in working order if switching relays are depended upon for controlling the train of operations in the system. Furthermore, a group of such relays is necessary for each subscriber line in the exchange office which multiplies the duties of the force in attendance at the exchange. A number of these switching control operations may be governed by multielement glow discharge devices of this invention thereby considerably reducing the equipment and maintenance requirements at the central office of the system. Furthermore such a device operates without inertia and operates at high speed to set up discharge paths between the electrodes in a definite sequence dependent on the train of operations occurring in the switching frames handling the call.

A specific type of glow discharge device embodying the features of this invention is shown in Figs. 1 to 4 inclusive of the drawings. It provides a lock-out characteristic which allows only one subscriber at a time to gain access to the control circuits for advancing the call from the primary frame to the secondary junctor and register frames even though several calls in the same switch group are made simultaneously. Also, it utilizes a main discharge gap which supplies sufficient current for a momentary period to energize the select magnets of the switches in the originating exchange office. In addition there are twin groups of auxiliary gap control elements for initiating and terminating the train of control operations in the device and associated therewith are a plurality of auxiliary anode elements which cause the discharge path in the device to be transferred in a predetermined sequence if the register, class of service, and code number conditions advance the call to the called subscriber.

The device comprises a cylindrical glass enclosing vessel 10 having a closed dome end portion 11 and a pressed disc glass stem 12 sealed to the opposite end. The stem is provided with a central exhaust tubulation 13 which is sealed off close to the stem at 14 after the space within the vessel is evacuated to a low pressure and a desired inert gaseous filling, for example of argon, is introduced into the vessel. The stem also carries a plurality of terminal pins 15 sealed through bead abutments 16, to strengthen the glass to metal joints in the stem. After the stem is formed with the pins therein and before sealing to the vessel, the multiple electrode elements, involving this invention, are mounted on the pins so that the various electrodes are provided with external connections for applying suitable potentials to them.

Figure 3:
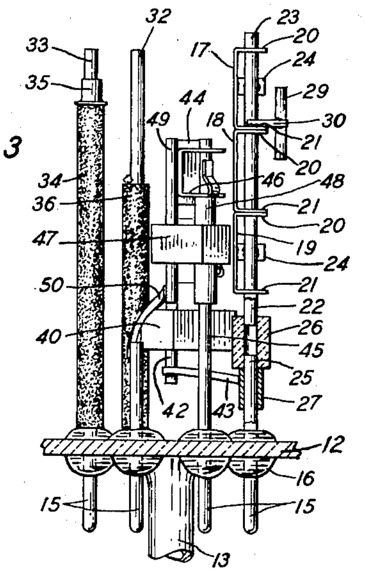
Fig. 3 is a side view in elevation, similar to Fig. 2, and showing other details of the assembly and particularly the insulated coupling of one of the main cathode supports.
Figure 4:
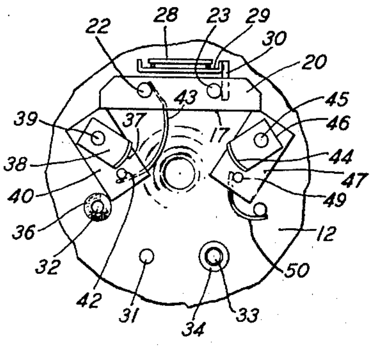
Fig. 4 is a top plan view of the electrode assembly of Fig. 2 showing the special relation of the various groups with respect to the main cathode surface.

A large area cathode surface forms the main electrode in the device and is fabricated in sectional form to increase the rigidity of the cathode and to provide extension flanges for coupling to external heating means for dividing gases from the large electrode area. It is formed of three rectangular sections 17, 18 and 19 of sheet metal, such as nickel, and each section is reinforced by bent portions 20 and 21 to form a channel-shaped element. These sections are mounted in a vertical plane on a pair of support rods or wires 22 and 23 by thin metallic straps 24 which are preferably welded to the rods and the back surfaces of sections 17 and 19 to rigidly affix the combined assembly on the support rods. The rods extend through the bent portions in built-up planar fashion, one of the rods 23 being continuous and welded to a terminal pin in the stem to supply a desired negative potential to the cathode surface. The other rod is shortened, as shown in Fig. 3, just below the cathode assembly but is coupled to and aligned with terminal stub 25 in the stem by a ceramic insulating spacer block 26 supported on the stub by a welded metallic sleeve 27. Since the cathode surface is coated on the large exposed area with electron emissive material which is energized by a glow or cold discharge, only one terminal connection is necessary for the cathode, although the other support rod maintains the large surface in desired space relation to the other multiple electrodes in the device.

Due to the large area of the cathode and its relation to the other electrodes in the device, it is necessary to mount the cathode sections in a particular manner in order to provide sufficient space and high breakdown voltage characteristic between the separate groups of other electrodes. This is accomplished by fitting the sections together in staggered relation with the short edges of sections 18 and 19, which are the lowermost sections and shorter than section 17, offset with respect to each other so that their center lines do not coincide. The top section 17 has one short edge in line with the adjacent edge of section 18 and the opposite edge in line with the linear edge of section 19. This provides clearance space for the auxiliary groups of elements closely adjacent to the main cathode surface which will be described in detail hereinafter. The cathode assembly is also employed as a barrier mounting for the getter or active gas absorber which is flashed during the final assembly of the device, to fix residual gases not completely removed in the vacuum pumping of the device. The getter material, in the form of a ring or loop 28, is welded to a flanged shield 29 and is supported on the rear surface of cathode section 17 by a wire 30 welded to support rod 23, the shield and getter being directed toward the surface of the glass vessel furthest away from the other electrodes so that the gas absorbing film deposited on the glass will not cause leakage or conduction between the various electrodes in the device.

Directly opposite and to one side of the axial line of the cathode assembly an elongated metallic rod 31 extends linearly from an appropriate terminal pin 15 in the stem, to constitute the main anode associated with the cathode in the main discharge path or gap in the device, so that a high current flows through this discharge path under appropriate potentials on the electrodes to energize relatively low ohmic resistance elements or select magnets associated with the switches in the central office. In addition to the main anode 31, a pair of auxiliary anodes 32 and 33 are provided and these anodes, which are similarly in rod form, are placed on opposite sides of and parallel to the main anode. Each auxiliary anode projects from a separate terminal pin 15 in the stem with the rod 32 spaced from and in line with the left-hand edge of the main cathode sections 17 and 18 and the rod 33 in the same plane transversely as the main anode and in line with the cathode supporting conductor 23. These auxiliary anodes are energized selectively in a predetermined manner in the operation of the device, which depends on the sequence and potentials applied to them due to the transfer of the glow discharge. This is partially controlled by the extent of the metallic portion of the anodes exposed to the ionized discharge path. The anode 33 is substantially shielded by a ceramic insulating sleeve 34 which surrounds the rod 33 and is held thereon by an eyelet 35 welded to the rod near the top so that only a short length of exposed metal is presented to the discharge path. The other auxiliary anode 32 has a shorter sleeve 36 surrounding it so that a greater portion of this anode is exposed to the discharge path. The purpose of these insulating sleeves is to increase the breakdown voltage between these anodes and anode 31 as well as the control element.

Intermediate the main cathode surface and the multiple rod anodes are separate groups of similar pairs of elements for controlling the initiating and terminating discharge paths which fire at the start and end of the sequence or train of events in the switching system. These groups are disposed at opposite edges of the main cathode surface and are situated at contraposed acute angles with respect thereto. In addition, the separate groups are mounted at different elevations with respect to the cathode surface to provide the proper transfer characteristics with respect to anodes 31, 32, 33 and the main cathode, which is formed of the rectangular sections 17, 18, and 19.

The initiating group or twin elements adjacent the short edge of cathode section 19 includes a rectangular strip 37 of sheet metal, such as nickel, mounted longitudinally with the long dimension slightly bowed outwardly and coated on the outer surface with the same electron emissive material as is used on the main cathode surface. The initiating control cathode is supported by a box-shaped bracket 38 welded to the rear surface of the cathode 37 and provided with aligned apertures which slide the bracket over an extension wire or rod 39 attached to another terminal pin in the stem. The bracket is secured to the rod 39 by a tab of the bracket extending between the aligned apertured portions and parallel to the portion welded to the cathode surface 37. An insulating block 40 is affixed to the wire extension 39 by threading one end over the wire and below the cathode 37, the block being held thereon by cementing to a metallic sleeve 41 extending on opposite sides of the block and surrounding the wire to which it is welded. The block 40 is mounted on the rod 39 at a greater angle than the cathode 37 with respect to the main cathode surface and supports a stub wire anode 42 in straight line relation to the wire extension 39 in the block 40 but spaced about .008 inch from one edge of the cathode 37. The short anode 42 is connected to an external circuit by a strap 43 attached to the anode below the block and joined to the short stub extension 25 associated with the main cathode support, as shown more clearly in Fig. 4.

The particular location of the anode 42 with respect to the cathode 37 facilitates the initiating discharge at a low voltage breakdown yet eliminates interference with subsequent discharges with respect to other electrodes in the device during the train of transfer current passage since the offset relation of the anode does not produce a shadow effect on the cathode surface which tends to block or shield the greater part of the cathode surface. In addition, the close spacing of the initiating group elements and the extension of the anode rod 42 along the edge of the cathode surface 37 readily establishes an ionizing discharge therebetween at low breakdown potentials and permits sustaining the discharge after breakdown at still lower voltages. The location of the group elements to the left of the main cathode surface provides clearance between the main cathode and the group of anodes opposite thereto and also allows the mounting of the group close enough to the main cathode surface but with sufficient clearance and insulation resistance therebetween so that false breakdown discharge does not occur in the device.

The terminating group elements are similar. Another cathode strip 44 is mounted on a conductor extension 45 of a terminal pin by a bracket 46 attached to the cathode in the same manner as heretofore described. An insulating block 47 is secured to the extension support by a metallic sleeve 48 extending above and below the block and a short anode wire 49 extends from the opposite end of the block parallel to the outer edge of the cathode strip 44. The anode 49 is connected below the block to the remaining terminal pin in the stem by a strap conductor 50. The terminating group assembly is elevated to a position parallel to the intermediate cathode section 18 so that it is close to the short edge of this cathode section.

After all the multiple elements are mounted on the stem, as heretofore described, a spot of radium bromide 51 is placed on the inner surface of the dome portion of the glass bulb, as shown in Fig. 1, and the bulb is sealed to the stem. The device is then connected to the pumping station to preheat the electrodes to remove occluded gases, the emissive coating on the cathode surface is activated and the getter flashed after securing a low pressure in the device. The vessel is filled with an inert gas or a mixture of gases, for example, a quantity of argon gas at a pressure of 15 millimeters of mercury although other gases and pressures may be employed in the devices depending on the characteristics and operating voltages desired. After the gaseous atmosphere is injected, preferably through the tubulation 13, this is sealed off the pumps and the device is completed.

Although the various groups of electrodes constitute numerous elements exposed to the glow discharge in the device, the specific arrangement or geometry provides a multiple switching array which controls the breakdown of the glow discharge and transfers the paths of the discharge in a predetermined manner to effect a train or sequence of operations depending on the time, space relation, potential of the elements in the device and condition of the equipment in the central office as a call progressed between the calling and called lines in an automatic switching telephone system.

Typical operating characteristics for the device shown in Figs. 1 to 4, inclusive, are:

| | | |
|---|---|---|
| Breakdown voltage—control anode to control cathode—initiating gap | volts | 80 |
| Sustaining voltage—same | volts | 60 |
| Main gap working voltage | volts | 185 |
| Main gap sustaining voltage | volts | 70 |
| Main gap operating current | m.a. | 25 |
| Anode transfer—current from initiating gap elements required with main anode at 150 volts | m.a. | 50 |
| Cathode transfer—voltage of main cathode with respect to control cathode with one milliampere current flowing between main anode and the same control cathode | volts | 90 |

The advantages of these electronic switching devices over mechanical devices may be summarized by considering that the cathode in these devices operates "cold" so that they do not draw current during standby periods yet are available for instant operation. The life of the device is dependent only upon the time of operation and the magnitude of the current passing during this period. Hence, their life is not decreased by long standby periods. This allows the devices to conduct for only small fractions of the total time and to be used at very high currents. The glow device is voltage-operated. This is of convenience since it is many times easier to control a network of voltage sensitive elements than it is to control a network of current-operated devices. They may also be made highly sensitive since the control circuits take only 5 to 200 microamperes current while the work circuits may pass up to 200 milliamperes current. By large differences between breakdown and sustaining voltages a suitable lock-in operation may be secured. That is, the device will remain ionized after reduction of the ionizing potential. Furthermore, the glow discharge device possesses a lock-out feature which means that if a number of devices are connected in parallel and if voltage is applied to all of them simultaneously through suitable impedances, only one will fire and remain conducting. Since all the other devices then have a potential across them less than the breakdown value, they are locked out of the circuit. Similarly, by employing multielement devices interlocking operation may be obtained. This is possible since current may be made to flow to an electrode not only by the normal breakdown process but also by anode and cathode transfers. A signal may be stored in one group of elements in the device indefinitely and then in response to external voltages applied between conducting and non-conducting electrodes the discharge may be made to move from one electrode to another. In this way, the operation of the work circuit may be delayed until the proper combination of voltages is present on the switching device before the final train of operations is completed.

In order to follow the sequence of switching operations performed by the multiple groups of elements in the device of Fig. 1 and the selective transfer of the discharge to the various elements as the call progresses through the switching frames in the central office, a typical through-call operation will be described in which each step advances the discharge from the initiating group to the terminating group.

Assume that a group of subscriber lines is connected to a central office and associated with each line is a multielement electronic switching device, as shown in Fig. 1. As the subscriber removes the handset to call a distant party, for example, in a different exchange, the initiating control gap elements 42 and 37, respectively, of the device of this invention will be energized by suitable potentials, such as 100 volts on the anode 42 and 0 volts on the cathode 37, to cause breakdown of the small gap and conduction to be present therein. These potentials are applied to the respective electrodes by the primary and secondary switching frames associated with the calling subscriber which are actuated when the handset is removed to start the switching operations toward finding an idle trunk for the use of the calling subscriber. When an idle trunk is found, a battery of 130 volts will be supplied to the main anode 31 and the initiating discharge will be transferred to anode 31 from control cathode 37. Since ten glow switching devices are usually employed in a group at the office, all the main anodes are tied together and also the control cathodes are similarly tied. In this way, even though the initiating control gaps of several devices are energized simultaneously, only one device will conduct in the main anode-control cathode gap, and likewise in the main gap to actuate a select magnet. This enables only one idle magnet out of ten to be operated. Therefore, the subscriber, by means of the lock-out circuit, due to the transfer of the discharge in the device by energizing the main anode gap, gains momentary access to the control circuits which connect him to the junctor and register frames to advance the call through the crossbar switching system and at the same time locks out the other nine devices in the group. As the call progresses to the junctor frame, a negative voltage of −50 volts is applied to the main cathode and a cathode transfer of the discharge occurs between the main anode 31 and the main cathode surface. This gap is then capable of furnishing sufficient current, e. g., 25 milliamperes for 75 milliseconds, to energize the 1000-ohm select magnets on the junctor and register frames.

As the subscriber dials the code number into the register frame it is necessary to determine if he is entitled to the "class of service" within the scope of the call, such as party line, limited or extended service and other special services provided for subscribers. If the call is proper, a designated relay in a group at the central office will connect +130 volts battery to auxiliary anode 33, to transfer the discharge from the main cathode to this anode, to allow the call to proceed. After the information is recorded in the register the number group connector which contains the hundreds, tens and units switches for finding the called line is actuated. For example, if the code number dialed by the subscriber is 732 the 700 switch applies a battery of +50 volts to the terminating control anode 49 of all tubes in the 700 group. Similarly, the 30 switch applies a battery of −50 volts to the terminating cathode 44 of all tubes in the 30 group, and the 2 switch applies a battery of +130 volts to the auxiliary anode 32 of all tubes in the 2 group.

In this way only one of the line tubes, namely 732, will have all three of its terminating electrodes energized. If the called line is idle, the discharge will transfer to the main anode-main cathode gap to operate the hold magnet on the primary switch associated with this device which connects the called party back through the secondary switch to the particular junctor to which the calling party is connected.

The sequence or train of switching operations indicated by the transfers of the discharge paths in the electronic glow discharge device is positive and constant over a long operating life, sufficient for about thirty to forty years service, due to intermittent operation under normal conditions. Since the switching procedure in the device is inertialess no maintenance or supervision is necessary and a single device provides a substitute for a relatively large number of mechanical devices thereby considerably reducing the equipment and space necessary for the switching system in the central office. Furthermore, such devices are materially faster in operation, more sensitive, require less current drain and are unaffected by atmospheric conditions during long standby periods. The primary utility of the device, aside from these advantages, is that the multiple switching operations are performed in a predetermined manner in a definite train or sequence of steps and if the equipment in the central office fails to apply the assigned voltages to the various groups of elements in their regular order the call is not completed since the discharge does not progress to the main gap in the device.

Figure 5:
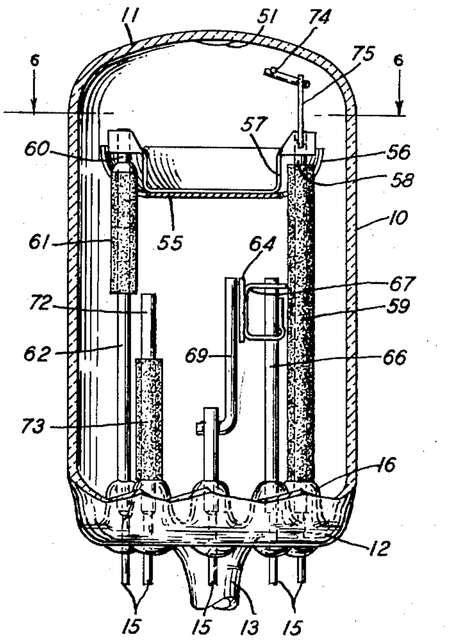
Fig. 5 is a view in elevation of another embodiment of the invention showing the symmetrical arrangement of the various groups of elements providing a higher breakdown voltage between the groups and main cathode surface.
Figures 6, 8:
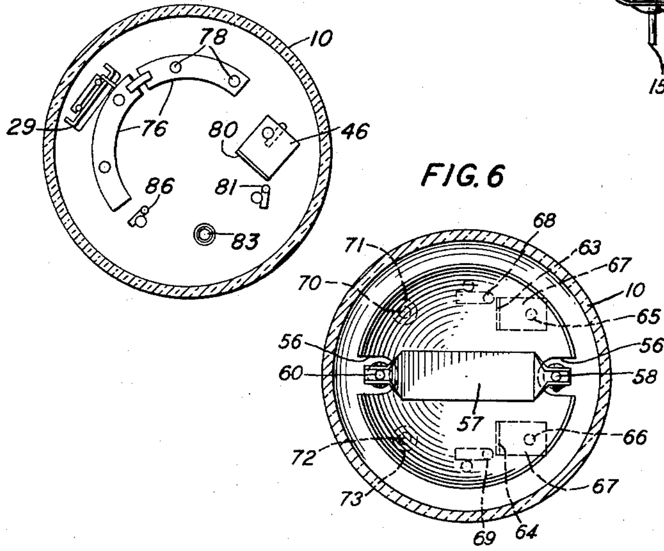
Fig. 6 is a sectional view of the device shown in Fig. 5 taken on the line 6—6.
Fig. 8 is a sectional view of the device shown in Fig. 7 taken on the line 8—8.

Figs. 5 and 6 show a similar device which functions in the same manner as the device of Fig. 1 and represents a construction in which the elements are arranged in a more symmetrical manner and providing greater spacing between the twin groups of control elements with respect to the main cathode surface to eliminate false operation of the gaps by surge voltages present in the main cathode circuit. In this construction, the main cathode surface 55 is circular, being in the form of an inverted dish-shaped metallic element mounted coaxially in transverse relation across the axis of the vessel 10 adjacent the dome portion 11, with the convex surface facing toward the stem 12 of the device. The facing surface is provided with an electron emissive material for projecting electrons into the discharge path toward the other electrodes. The cathode surface is provided with peripheral cut-out slots 56 on opposite edges across one diameter, as shown in Fig. 6, and a strap bracket 57 is secured across the inner surface in alignment with the slots 56 whereby the cathode may be mounted from the stem of the device. This mounting includes a continuous support wire 58 extending from a terminal pin 15 in the stem, which is attached to one side of the bracket 57 and substantially the entire length of the support wire is shielded by a ceramic sleeve 59. A stub wire 60 is attached to the opposite end of the bracket 57 and carries a short insulating sleeve 61 which joins to a rigid support rod 62 connected to an opposite terminal pin in the stem, the rod 62 serving as an auxiliary anode in the discharge path of the device. Twin rectangular plate cathode surfaces 63 and 64 are mounted in parallel relationship on opposite sides of the center line of the cathode surface and are supported by upright rods 65 and 66, respectively, projecting from terminal pins in the stem 12, the cathodes being supported thereon by brackets 67. Short wire anodes 68 and 69 are mounted on stub wires from separate terminal pins in the stem, the anodes extending parallel to and close to the outer edges of their respective cathode surfaces, to constitute the twin control gaps for initiating and terminating the discharge paths in the device. A rod 70 serving as a main anode extends from a terminal pin in the stem and is symmetrically spaced in parallel relation to the cathode 63 of the initiating gap group. A short insulating sleeve 71 shields a portion of the main anode 70 adjacent the abutment 16 on the stem. A similar auxiliary anode 72 extends from the stem in parallel relation opposite the terminating group of elements and is partially shielded by another insulating sleeve 73. The assembly is provided with a getter mounting 74 which extends beyond the cathode 55 and is mounted on the support rod 58 by a stub wire 75. The device is filled with a gaseous atmosphere at low pressure and the tubulation 13 is finally sealed off to complete the fabrication.

In this arrangement, the main cathode surface 55 is adequately spaced from the remaining electrodes and particularly the short control gap groups of elements in the device associated with the initiating and terminating sections so that high voltage surges present in the cathode circuit will not affect the operation of these gaps adversely. The position of the main cathode surface 55 offers unimpeded discharge paths to the main anode 70 and also to the auxiliary anodes 62 and 72, respectively. The anode 62, which determines that the subscriber is entitled to that "class of service," is located symmetrically with respect to each control gap group so that a uniform path may be utilized with respect to either control group of elements to effect suitable transfer discharge in other applications if so desired.

Figure 7:
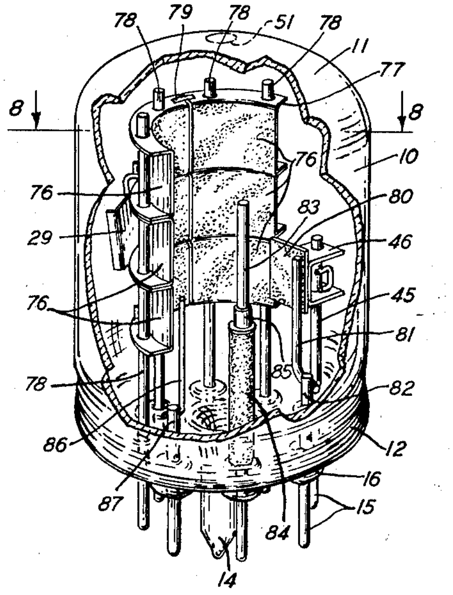
Fig. 7 is a perspective view of a modified form of the invention showing a lesser number of electrodes and their relationship with respect to a large area curvilinear form of cathode surface.

A modified form of the invention is disclosed in Fig. 7, in which the main cathode surface is made relatively large for greater current capacity and has a curvilinear configuration to increase its strength. The main anode is disposed in space relation to the cathode adjacent to the center of curvature of the cathode. In this construction, the cathode is formed of a plurality of pairs of arcuate sheet metal sections 76 having bent portions 77 on opposite edges with the sections built up in semicircular form and supported by four parallel wires 78 extending in an arc from the stem 12 through the flange portions 77, to lock the sections together as a whole, by welding to the rods. The sections are secured together at the center by a welded tab 79 across the juxtaposed flange portions at the top and bottom of the assembly. An electron emissive coating is applied to the concave surface of the sections to provide a large emission surface for handling the high current required of the device. The getter shield 29 is mounted on the rear surface of the cathode for cleaning up the residual gases in the device. A spot of radium bromide 51 is also applied to the dome of the vessel for creating initial ionization in the device.

A small rectangular control cathode surface 80 is parallel to the central plane passing through the cathode coincident with the axis and is mounted on conductor 45 by a bracket 46. A wire control anode 81 closely spaced along one edge of the cathode 80 is mounted on stub wire 82 projecting from the stem. The main anode 83 is positioned substantially at the focal point of the main cathode and extends parallel thereto from the stem in the form of a rigid rod or wire which is partially shielded by a ceramic sleeve 84 held on the anode by an eyelet 85. A separate control anode 86 is closely spaced adjacent the left-hand edge of the lower section 76 of the main cathode surface and is supported by a separate stub wire 87 in the stem which forms a continuation of one of the terminal pins therein.

In this construction the initiating discharge takes place between the small cathode surface 80 and the control anode 81 and when an idle trunk is found in the crossbar switch frame in the central office the main anode 83 is made sufficiently positive so that an anode transfer takes place and conduction is established between the main anode 83 and the control cathode 80. Then, if the main cathode surface is sufficiently negative, a cathode transfer takes place in the main discharge path and conduction is established between the main anode and the main cathode. This gap is capable of furnishing sufficient current to operate a number of relays or magnets in the crossbar switch system. When the discharge transfers to the main anode 83 the lock-out property of the device comes into play, to perform the preferential control in the system whereby the subscriber gains access to the junctor and register frames in the central office. Then in response to a dialed number, the register with the aid of a number group connector energizes the called line by means of the terminating control gap provided by the auxiliary control anode 86 operating in conjunction with the main cathode surface, to complete the series of operations for connecting the parties in the crossbar switching system.

While the invention has been disclosed with respect to various embodiments and the relationship of different groups of elements therein, it is, of course, understood that various modifications may be made in the detailed assembly and the coaction of the various groups to attain the objects of this invention. Furthermore, while these devices have been described in connection with crossbar switching systems it is obvious that they may be employed in other switching circuits wherein a series or sequence of operations are controlled in a predetermined manner, without departing from the scope of the invention as defined in the appended claims.

What is claimed is:

1. An electronic discharge device comprising an enclosing vessel having a gaseous filling therein, a main cathode having a surface, a main anode disposed in cooperative relation thereto, and an auxiliary group of elements offset from the main path between said cathode and anode, said group including a small plane cathode having a surface angularly disposed with respect to said large cathode surface and a wire anode adjacent and in line with the edge of said small cathode surface.

2. An electronic discharge device comprising an enclosing vessel containing a gaseous atmosphere at low pressure, twin groups of auxiliary gap elements extending in parallel relation within said vessel, a wire anode spaced oppositely and in line with each group of elements, and a main cathode having a surface extending across the space in said vessel and exposed to the discharge paths to all of said elements and anodes.

3. An electronic discharge device comprising an enclosing vessel having a stem, a circular main cathode extending across the space in said vessel, a pair of supports extending from said stem to said cathode, a pair of auxiliary gap elements supported linearly adjacent one side of one of said supports for the cathode, a similar pair of elements supported from said stem and equally spaced on the other side of the same cathode support, and a pair of wire anodes extending from said stem on opposite sides of said other support for said cathode and in facing relation to their respective auxiliary gap elements.

4. An electronic discharge device comprising a cylindrical vessel having a flat stem at one end and a dome portion at the other end, a gaseous filling in said vessel, an inverted dish-shaped main cathode in said vessel, a pair of wire supports extending from said stem and mounting said cathode adjacent the dome portion of said vessel, separate pairs of auxiliary gap elements within said vessel, each including a vertical cathode strip and a wire anode, a bracket support attached to said cathode strip, conductors in said stem connected to said brackets and wire anodes, said pairs of elements being disposed in parallel relation on opposite sides of and in front of one of said supports for said main cathode surface, a pair of separate auxiliary anodes projecting from said stem and disposed in opposite relation to said vertical cathode strips, insulating sleeves masking a portion of said auxilary anodes, and a sleeve coupling adjacent to said cathode insulating one of said supports therefrom and extending along the length of said one support to substantially opposite the tops of said separate auxiliary anodes.

5. An electronic discharge device comprising an enclosing vessel having a gaseous filling therein, a main cathode having a surface formed of a plurality of superimposed flanged sections, a main anode disposed opposite said cathode, and an auxiliary group of elements offset from the main path between said cathode and anode, said group including a small plane cathode having a surface and a wire anode adjacent to and in line with the edge of said small cathode surface.

6. An electronic discharge device comprising an enclosing vessel having a gaseous filling therein, a main cathode, a main anode element disposed opposite said cathode in parallel relation thereto and an auxiliary group of elements offset from the main path between said cathode and anode, said group including a small cathode having an emitting surface and a wire anode adjacent to and in line with the edge of said small cathode surface.

7. An electronic discharge device comprising an enclosing vessel having a gaseous filling therein, a main cathode, a main anode element disposed opposite said cathode, and an auxiliary group of elements offset from the main path between said cathode and anode, said group including a small cathode angularly disposed in a vertical plane with respect to said large cathode surface and a wire anode adjacent to and in line with the edge of said small cathode.

8. An electronic discharge device comprising an enclosing vessel having a stem, a gaseous filling therein, a main cathode, having angular reinforcing portions attached to the rear surfaces thereof, a main anode disposed opposite said cathode in parallel relation thereto, an auxiliary group of elements offset from the main path between said cathode and anode, said group including a small cathode and a wire anode adjacent to and in line with the edge of said small cathode, and conductors in said stem extending through said reinforcing portions of said main cathode.

9. An electronic glow discharge device comprising an enclosing vessel having a stem, a gaseous filling therein, a main cathode having a surface extending linearly from said stem, a plurality of parallel wire anodes of different lengths disposed opposite said cathode surface, and separate initiating and terminating gap elements intermediate said cathode and anodes and disposed adjacent opposite edges of said cathode surface.

10. An electronic discharge device comprising a vessel containing a gaseous filling at low pressure, a main cathode having a surface including a plurality of staggered sections, a plurality of parallel anodes in spaced relation to said cathode surface, each of said anodes presenting a different length active surface to the discharge path, separate starter and terminating gap elements on opposite edges of said cathode in lateral relation thereto, and individual insulating spacers separating the respective gap elements in said vessel.

11. An electronic glow discharge device comprising an enclosing vessel having a stem, a gaseous filling therein, a main cathode having a surface extending linearly from said stem, a plurality of parallel wire anodes disposed opposite said cathode surface, separate initiating and terminating gap elements intermediate said cathode and anode and disposed adjacent opposite edges of said cathode surface, insulating sleeves of different lengths on certain of said wire anodes, and insulating spacer blocks mounted below said gap elements to maintain the space relation between adjacent elements constant.

12. An electronic glow discharge device comprising an enclosing vessel having a stem, a gaseous filling therein, a main cathode having a surface including a plurality of superimposed sections having angular bent portions extending rearwardly therefrom, parallel supports in said stem projecting through said bent portions, a plurality of parallel wire anodes projecting from said stem and disposed at various distances from said main cathode surface, and separate pairs of auxiliary gap elements in spaced relation adjacent opposite edges of said main cathode surface, each pair being mounted in different elevation with respect to said cathode sections.

13. An electronic glow discharge device comprising an enclosing vessel having a stem, a gaseous filling therein, a main cathode having a surface extending linearly from said stem, said surface being composed of three superimposed sections having angular bent portions extending rearwardly therefrom, parallel supports in said stem projecting through said bent portions, the intermediate section being in staggered relation to the adjacent sections, a plurality of parallel wire anodes projecting from said stem and disposed at various distances from said main cathode surface, and separate pairs of auxiliary gap elements in spaced relation to said cathode surface, one pair of elements being mounted at an angle with respect to the edge of the lower cathode section, and the other pair being mounted at an angle to the edge of the intermediate cathode section and in opposite relation to the first pair of elements.

14. An electronic glow discharge device comprising an enclosing vessel having a stem, a gaseous filling therein, a main cathode having a surface composed of a plurality of superimposed sections having angular bent portions extending rearwardly therefrom, a pair of support rods passing through said bent portions, short conductors in said stem in alignment with said rods, one of said rods being affixed to one conductor and the other rod coupled to the other conductor by an insulating spacer block, a plurality of parallel wire anodes projecting from said stem and disposed at various distances from said main cathode surface, separate pairs of auxiliary gap elements adjacent opposite edges of said main cathode surface, a conductive connection between one of said elements and the insulated conductor aligned with one of said cathode support rods, and conductors in said stem for the remaining gap elements.

15. An electronic discharge device comprising an enclosing vessel having a stem, a gaseous filling therein, a main cathode having a surface formed of a plurality of superimposed angular sections, supports in said stem projecting through said sections, a plurality of parallel wire anodes projecting from said stem and disposed at various distances from said main cathode surface, separate pairs of auxiliary gap elements adjacent opposite edges of said main cathode surface, each group of gap elements including an elongated metallic strip constituting an auxiliary cathode surface, an angle bracket attached thereto, a support wire from said stem secured to said bracket, an insulator block extending from said wire below said cathode strip, and a short auxiliary anode wire supported by said block adjacent a longitudinal edge of each cathode strip.

16. An electronic glow discharge device comprising an enclosing vessel, a gaseous filling therein, a main cathode extending across a portion of said vessel, and a plurality of wire anodes in cooperative relation with said cathode, said anodes comprising a main anode and separate initiating and terminating gap elements offset from the main path between said main cathode and said main anode.

17. An electron discharge device comprising an enclosing vessel having a gaseous filling therein, a main cathode, a main anode disposed in cooperative relation with said main cathode, a plurality of auxiliary anodes disposed in cooperative relation with said main cathode and offset from the main path between said main cathode and said main anode, and an auxiliary cathode adjacent one of said auxiliary anodes and defining a separate initiating gap therewith, said auxiliary cathode being disposed in cooperate relation with said main anode.

18. An electron discharge device in accordance with claim 17 wherein another of said auxiliary anodes is the terminus of a terminating gap offset from the main path between said main cathode and said main anode.

WALLACE A. DEPP.

REFERENCES CITED

The following references are of record in the file of this patent:

UNITED STATES PATENTS

| Number | Name | Date |
|---|---|---|
| 1,408,053 | Wensley | Feb. 28, 1922 |
| 1,939,063 | Knowles | Dec. 12, 1933 |
| 2,295,569 | Depp | Sept. 15, 1942 |
| 2,415,816 | Depew et al. | Feb. 18, 1947 |